United States Patent
Zhang et al.

(10) Patent No.: US 9,237,756 B2
(45) Date of Patent: Jan. 19, 2016

(54) METHOD FOR PREPARING AND CONDITIONING GRANULAR BURDOCK ROOTS THROUGH COMBINED UNIFORM DRYING BY USING RADIO FREQUENCY PRETREATMENT AND MICROWAVE PULSE SPOUTING

(71) Applicants: Jiangnan University, Wuxi (CN); Ningbo Haitong Foods Scientific & Technological Company LTD., Cixi (CN)

(72) Inventors: Min Zhang, Wuxi (CN); Dandan Zheng, Wuxi (CN); Yi Lu, Wuxi (CN); Qifeng Zhong, Wuxi (CN); Zaixing Yang, Wuxi (CN)

(73) Assignee: JIANGNAN UNIVERSITY, Cixi (CN)

( * ) Notice: Subject to any disclaimer, the term of this patent is extended or adjusted under 35 U.S.C. 154(b) by 86 days.

(21) Appl. No.: 14/271,645

(22) Filed: May 7, 2014

(65) Prior Publication Data
US 2015/0086684 A1  Mar. 26, 2015

(30) Foreign Application Priority Data

Sep. 25, 2013 (CN) .......................... 2013 1 0438304

(51) Int. Cl.
*A23L 1/214* (2006.01)
*A23B 7/01* (2006.01)
*A23B 7/10* (2006.01)
*A23L 3/3508* (2006.01)
*A23B 7/022* (2006.01)
*A23L 3/01* (2006.01)
*A23L 3/358* (2006.01)

(52) U.S. Cl.
CPC . *A23B 7/01* (2013.01); *A23B 7/022* (2013.01); *A23L 3/01* (2013.01); *A23L 3/358* (2013.01); *A23L 3/3508* (2013.01)

(58) Field of Classification Search
CPC .................. H01J 37/32825; H01J 37/32725; F26B 3/343; F26B 3/347; A23B 7/01; A23B 7/022; A23L 3/01; A23L 3/3508; A23L 3/358

USPC .............. 219/680, 687, 701, 121.36; 34/255, 34/259; 426/234, 237, 238, 241, 242, 244, 426/455, 456, 443

See application file for complete search history.

(56) References Cited

FOREIGN PATENT DOCUMENTS

| CN | 1698467 | | 11/2005 |
|---|---|---|---|
| CN | 101433233 | | 5/2009 |
| CN | 101703196 | | 5/2010 |
| CN | 101889603 | | 11/2010 |
| CN | 101999609 | | 4/2011 |
| CN | 102058090 | | 5/2011 |
| CN | 102062525 | | 5/2011 |
| CN | 101703196 B | * | 11/2011 |
| CN | 102415540 A | * | 4/2012 |
| CN | 102058090 B | * | 9/2012 |
| CN | 102726508 | | 10/2012 |
| CN | 102986838 | | 3/2013 |
| JP | 55118344 A | * | 9/1980 |

OTHER PUBLICATIONS

Hui et al., Food Drying Science and Technology, DEStech Publiciations, 2008, pp. 301-304.*

* cited by examiner

*Primary Examiner* — Viren Thakur
*Assistant Examiner* — Thanh H Nguyen

(57) ABSTRACT

A method for preparing and conditioning granular burdock through combined uniform drying by using radio frequency (RF) pretreatment and microwave pulse spouting is provided. The process of the present disclosure includes performing pretreatment on fresh burdock, protecting color, pre-drying by RF, drying through microwave pulse spouting, and packaging. The color and luster of a product are greatly improved after color protection, the RF pre-drying treatment may be performed for 20 minutes, and hot air drying treatments for removing moisture on the surface may be performed for 60 minutes. The method has a short drying time and high efficiency. The sectional microwave pulse spouting treatment needs 60 minutes totally, while the complete hot air drying treatment needs 400 minutes. Therefore the drying time of the method is greatly shortened, and the drying is uniform, and a sample after microwave pulse spouting drying has strong fragrance.

8 Claims, No Drawings

METHOD FOR PREPARING AND CONDITIONING GRANULAR BURDOCK ROOTS THROUGH COMBINED UNIFORM DRYING BY USING RADIO FREQUENCY PRETREATMENT AND MICROWAVE PULSE SPOUTING

CROSS REFERENCE TO RELATED PATENT APPLICATIONS

This application claims priority to Chinese Patent Application No. 201310438304.1, filed on Sep. 25, 2013, entitled "Method for Preparing and Conditioning Granular Burdock Through Combined Uniform Drying By Using Radio Frequency Pretreatment and Microwave Pulse Spouting," which is hereby incorporated by reference in its entirety.

TECHNICAL FIELD

The present disclosure relates to the field of fruit and vegetable food processing technologies, and in particular, to a method for preparing and conditioning granular burdock through combined uniform drying by using radio frequency pretreatment and microwave pulse spouting.

BACKGROUND

Burdock, also called great-son or oriental ginseng, has fleshy roots being rich of protein, amino acid, various vitamins, mineral elements and synanthrin specific for feverfew, carotenoid content of the burdock is second-highest among vegetables. Protein content and calcium content of the burdock are the highest among root vegetables. A burdock root is gray white, and browns when the root is exposed to air. During storage, fibration easily occurs for the burdock root so that the burdock root is poor in taste or is even inedible. In order to keep the nutritional components of the burdock and prevent the fibration during fresh storage, it is a feasible and effective method to perform slicing and drying on the harvested burdock.

Radio frequency (RF) is a high-frequency alternating current electromagnetic wave having a frequency range of 3 kHz-300 MHz. The RF can penetrate into the internal of a material, cause oscillation and migration of charged ions in the material, and convert electrical energy into thermal energy, thereby achieving the objective of heating. At the end of the 1980s, the RF technology is successfully applied to drying processing of bakery products such as biscuits after baking, which greatly reduces the power consumption, and also improves the quality of products. This is the most successful commercial application of the RF technology in the field of food processing so far. Since the 1990s, along with the gradual increase of food safety awareness, the application of the RF technology in the field of sterilization of agricultural products and foods has become a research hotspot all over the world. Currently, 3 RF frequencies commonly used in the fields of industry, scientific research, and pharmaceutical industry (ISM) are respectively 13.56 MHz, 27.12 MHz and 40.68 MHz.

The microwave is an electromagnetic wave having the frequency between 300 MHz and 300 GHz, the microwave drying is characterized in generating a heat source inside the material, so that the drying time is greatly shortened. However, common microwave drying is not uniform. In order to overcome the non-uniformity of the microwave drying, the present disclosure performs drying by using pulse spouting together with microwave. By feeding air into a drying chamber at intervals to form pressure difference, a spouting air flow is generated, which pushes the material to move to a random position in the microwave field, so as to implement uniform heating of the microwave, avoid occurrence of burnt points, improve the uniformity of product quality, and ensure a certain degree of puffing. The processing manner can greatly shorten the drying time, and improve the production efficiency. A drying processing device when the pulse microwave is short has advantages such as a simple structure, low cost, small floor area, convenient and flexible use, and desirable effect.

In order to improve the drying efficiency and quality of vacuum drying of burdock, Wang Huihui, Li Chenghua et al (2008), through single-fact test and quadratic orthogonal regression design experiment, discuss influences of three factors including the drying temperature, the vacuum degree and the burdock slice thickness on two indexes including the drying rate and the shrinkage rate, and obtain, through optimizing calculation, optimal parameters for vacuum drying of burdock roots: the thickness being 5.9 mm, the vacuum degree being 0.075 MPa, and the temperature being 75° C., where the drying shrinkage rate of the burdock is 42.73% under these parameters. The drying time of the highly-vacuum drying method is 6 hours, and this is much longer than the drying time of the present disclosure which is only 100 minutes. The rapid drying rate is the distinguishing feature of microwave, and thus the present disclosure adopts the drying manner of microwave spouting.

Luo Shucan, Huang Wei et al (2006) studied a process of microwave puffing papaya blending flakes, in which papaya is used as a major raw material, potato starch, waxy rice starch and corn starch are used as ingredients, and the process of processing papaya blending flakes is studied. Results show that, 15% potato starch and 15% waxy rice starch are added to the papaya flakes, the papaya flakes are pre-dried to have moisture content being 10%, the papaya flakes are then puffed by using microwave at the microwave power of 800 W for 25 s, and the puffed flakes have the optimal organoleptic quality. However, the microwave puffing conditions are difficult to control, and it cannot ensure that every batch of materials has the same organoleptic quality. The present disclosure adopts a microwave spouting manner, which can not only solve the characteristic of non-uniformity of microwave drying, but also has higher drying efficiency, simple device operation, and can ensure consistent product quality under a certain technical condition, thereby obtaining an ideal drying effect.

Han Qinghua, Li Shujun et al (2006) studied a process of microwave vacuum drying and puffing apple flakes, and tested on relationships of the microwave power, the pressure, the material thickness, and the initial moisture content of apple flakes after pretreatment with the drying characteristic and puffing rate thereof, so as to obtain preferable processing parameters. Under conditions that the microwave power is 12.0 W/g, the pressure is 15 kPa, the thickness of apple flakes is 8 mm, and the initial moisture content of apple flakes after pretreatment is 37.5%, the apple flakes can be dried and puffed with a high quality, and the maximum puffing rate reaches 321% when the drying time is 4 min. However, the microwave conditions are difficult to control, and the quality of dried product is not uniform, which are always defects of microwave drying. A combined drying manner using microwave and spouting can solve the above problems, and this drying manner is also suitable for industrial mass production.

Yang Xinfeng (2008) studied a process of microwave puffing mango flakes, in which microwave puffing is performed on pre-dried mango strips and mango slices, influences of moisture content, material shape, dextrin and $CaCl_2$ on the microwave puffing are studied, and the puffing rate, the degree of crisp, the color and luster, and the smoothness of appearance are evaluated. Results show that: slice-like material is more suitable for microwave puffing than strip-like material, and the optimal conditions for microwave puffing mango slices include that: the mango slices are pre-dried before puffing so that the water mass fraction is reduced to 12%, and the mango slices are then microwave puffed for 22 s to obtain products with desirable puffing rate, degree of crisp, color and luster, and appearance; when the concentration of the dextrin is less than 7%, the degree of crisp and color and luster of the flakes are improved to some extent. However, the microwave puffing conditions are difficult to control, and nutritional components in fruits are easily damaged due to over-high heating temperature, which can be solved by a manner using pulse spouting together with microwave drying; moreover, the pretreatment performed by hot air drying also affects the color and luster of the product, which can be avoided during high-vacuum drying.

Liu Yanhong, Yang Baoling, Mao Zhihuai (2010) studied applications of the RF technology in agricultural products and food processing, and discussed working principles and features of the RF technology, application research status of the RF technology in fields of agricultural products and food processing, and existing major problems; furthermore, an application prospect of this technology in China is further proposed. Specific advantages of the RF technology such as selective heating, self-balancing effect of moisture content, and deep penetration of energy enable the technology to have giant development potential in fields of agricultural product drying, deinsectization, and sterilization and heat treatment of powder and porous materials. Compared with the conventional heating manner, the RF technology has fast speed, uniform heating, low material temperature, and self-balancing effect of moisture content. Compared with the microwave heating, the RF drying has deeper penetration of energy and smaller device investment. The RF heating system has strict requirement on a geometrical shape of a material, and the material has to have a regular and simple geometrical shape, and therefore, the RF heating system cannot be as popular as microwave ovens. However, because industrial products are mostly of regular geometrical shapes, and containers having regular shapes are always used in agricultural product processing, the limit of the geometrical shape does not affect the industrial application of the RF technology.

After retrieval, patents closely associated with the present disclosure are specifically analyzed as follows.

According to Chinese Patent entitled "Formula of Crispy Vegetable Slice Food and Making Method Thereof" (Du Weihua, Ye Yuanping, Sun Jincai, Zhang Min, Chen Yiping, Chen Baobian, Yang Jiankui, Grant No.: ZL200510040549.4), regular vegetables as used major raw materials, flavoring and color substances are appended, then the vegetables are boiled to blend the flavors, and drying is performed by using a vacuum microwave new technology, so as to obtain flavored crispy vegetable slice products having high preserving rate of nutritional components, crispy texture, bright color and luster, and blended fragrance. Moreover, defects of fired food are avoided, and the invention has the advantages of a short production period, low cost, and high market acceptance. However, vacuum microwave drying conditions are difficult to control, and the heating uniformity of the product needs to be improved, those problems can be solved by using pulse spouting in combination with microwave drying. Further, the above effects can also be achieved in high-vacuum drying.

According to Chinese Patent entitled "Method for Rapidly Making Non-Puff Low-Sugar Freeze-Drying Crispy Fruit Slices" (Zhang Min, Huang Luelue, Sun Dongwei Sun Dongfeng, Zhang Weimin, Ding Zhansheng, Grant No.: ZL201010522767.2), a sublimation drying process of fruit slices still adopts vacuum freeze-drying, a desorption drying stage adopts microwave vacuum drying, and then hot air drying is used to lower the moisture content of the fruit slices to be less than 5%. Using the microwave vacuum drying and hot air drying as post-processes of the freeze-drying can greatly reduce the power consumption, and the quality and appearance of the obtained product is almost the same as that obtained by freeze-drying. However, in this patent, the crispy fruit and vegetable slices are not puffed, and thus cannot be eaten as leisure products, which is a problem to be solved.

According to Chinese Patent of Jiangnan University entitled "Negative-Pressure Microwave Uniform Spouting and Drying Device and Application" (Zhang Min, Wang Yuchuan, Grant No.: ZL 201010572843.0), because materials can be spouted under negative pressure, the device is used to implement spouting, rotating, circulating of the materials under vacuum microwave drying conditions, thereby achieving the objective of drying the material efficiently and uniformly; moreover, the drying time is shortened by more than 40%, thereby greatly reducing the cost for mass production. The present disclosure uses the experience of this drying method to obtain a desirable drying effect.

According to Chinese Patent of Hou Lijun entitled "Dried Burdock Processing Method" (Hou Lijun, Application No.: CN 102726508 A), the invention relates to a dried burdock processing method which comprises the steps of: selecting raw materials, cutting the raw materials into slices, baking and packaging. The dried burdock processing method is creative on the basis of the traditional method, the burdock is refined into a natural health food by applying an advanced baking method, and thus the edible period of the burdock is prolonged, the dried burdock brings the convenience for eating of people; and the burdock processing method is simple and easy to operate, thus the editable range of the burdock is enlarged, and the market prospect is broadened. In this patent, the baking time is 2-4 hours, and manual stirring is always required during the baking, which is extremely labor and resources consuming; however, using microwave spouting drying is not only time-saving and labor-saving, but also ensures high quality of the product.

According to Chinese Patent of Lianyungang Kuchifuku Foods Co., Ltd entitled "Production process of freeze-dried burdock" (Weng Jun, Li Aijun, Yao Jinxue, Application No.: CN 101889603 A), the invention includes the steps of taking fresh burdock as a raw material, cleaning with water, dicing, sterilizing, cooling, and precooling for 12-24 hours; freezing the precooled and diced burdock; drying the frozen and diced burdock in a vacuum drier, where the vacuum degree in the sublimation drying stage is 80-120 Pa, and the vacuum degree in the desorption drying stage is 1-10 Pa; and after finishing drying, cooling, vacuuming and carrying out nitrogen gas packing to obtain the freeze-dried burdock. The process is simple and reasonable, and can reserve the food tissues, nutritional components and flavored substances in the burdock. The freeze-dried product has the advantages of favorable rehydration property, light weight and the like, and can be stored at room temperature. However, the drying time is far longer than that of microwave spouting drying, and therefore, the present disclosure saves more drying time and energy consumptions, and is advantageous in efficient and energy-saving.

According to Chinese Patent of Jiangnan University entitled "Intermediate Wave Infrared and RF Combined Drying Method Suitable for Dehydration of Large-Scale Seasoning Edible Mushrooms" (Zhang Min, Wang Hongcai, Chen Weiping, Wang Zhaojin, Application No.: CN 201210537827.7), the invention adopts a new method for combined drying by using intermediate wave infrared in a former stage and using the RF drying in a later stage, the problem of difficulty for removing the moisture in the later stage of the intermediate wave infrared drying is solved, because the RF has strong penetrability. The materials during the RF drying process can be placed in a plurality of layers, so that nutrition and shapes of the product can be retained to a large extent; at the same time, drying time is shortened significantly; drying energy consumption is lowered; and cost is reduced. The present disclosure first adopts RF drying to perform pretreatment, and performs microwave spouting drying after the moisture on surfaces of the material is removed, so that the total drying time is short, and a desirable drying effect is obtained.

According to Chinese Patent of Jiangnan University entitled "Auxiliary Spouting Method for Improving Microwave Drying Uniformity of Granular Fruits and Vegetables" (Zhang Min, Sun Jincai, Zhong Qifeng, Yan Weiqiang, Fan Liuping, Chen Yiping, Grant No.: ZL 200810244418.1), pretreated fruits and vegetables are placed into a microwave spouting drying bed, the microwave power and the air intake heating temperature are preset to ensure that a dried material spouts in the spouting bed in different forms, the air intake pressure and the air intake angle are adjusted according to different drying stages of the material, and the microwave energy received by the material is more uniform than that of the conventional fixation or fluidization mode; and the microwave adopts internal heating, so the moisture of the dried fruits and vegetables is effectively and quickly evaporated to achieve the aim of uniform drying. Through the auxiliary spouting method, the material is uniformly heated in a microwave field, the moisture is evaporated quickly, the drying time is greatly shortened, the prior color and luster, shape and nutrient substances of the dried fruits and vegetables can be retained to the maximum extent, and the dried fruits and vegetables have porous structures and good rehydration property, thereby obtaining a high-quality dehydrated fruit and vegetable product. The present disclosure first adopts RF drying to perform pretreatment, and performs microwave spouting drying after the moisture on surfaces of the material is removed, so that the total drying time is short, and a desirable drying effect is obtained.

According to Chinese Patent of Jiangnan University entitled "Stage Method for Improving Uniform Puffing Effect of Granular Fruits and Vegetables During Microwave Spouted Drying (Zhang Min, Sun Jincai, Yan Weiqiang, Lu Liqun, Lou Fangqiong, Grant No.: ZL 200910213559.1), the method mainly includes the steps of: performing selection, washing, dicing, enzyme killing by blanching, and color protection treatment on fruit and vegetable raw materials; placing the pretreated fruit and vegetable cubes into a microwave spouted drying bed; setting the microwave power and the air inlet heating temperature; then performing the combined drying of stage hot air drying and microwave drying; and controlling different spouted air intakes at different drying stages, where the uniform puffing effect of products is improved during the quick microwave drying. The method has the advantages that the method ensures that the granular fruits and vegetables are uniformly heated in a microwave field through a hot air and microwave spouted drying stage method, has quick moisture evaporation, ensures that the fruits and vegetables have porous structures after the drying, effectively improves the puffing degree of the products, also improves the puffing effect of the products and ensures the uniform puffing of the products while the granular fruits and vegetables are quickly dried, and has the characteristics of good preservation of nutritional components and good qualities of color and luster, sense and the like. The present disclosure first adopts RF drying to perform pretreatment, and is different from the hot air drying and microwave spouted drying stage method of this invention.

According to Chinese Patent of Jiangnan University entitled "Uniform Color-Protecting Method of Recombination Mixed Purple Potato Microwave Spouting Drying Product" (Zhang Min, Liu Peng, T. Farringdon, Grant No.: ZL 201010572755.0), when purple potato leisure foods are produced by using purple potatoes as main raw materials, the special purple color of the purple potatoes is protected, and the method includes the steps of: cleaning the purple potatoes and other potatoes, peeling, trimming, chipping, spraying color-protecting liquid, steaming and curing, pulping, mixing pulps according to the proportion of the purple potatoes to the other potatoes of 8:2-4:6, forming, pelleting, secondarily protecting color, pre-drying with hot air, spouting and drying with microwaves, and packaging; and controlling the moisture content of the final product to be not higher than 6%. The product has flavors and nutrients of the purple potatoes and the other potatoes and has the special color of the purple potatoes. The drying method uses the microwave spouting bed to obtain crispy and puffing leisure food. Because of the existence of an air flow field, the drying time can be effectively shortened, and the uniformity of drying materials with microwaves is increased. The product has advantages on the aspects of color protection, nutrient maintaining, organoleptic quality and the like compared with the conventional processing mode. The present disclosure adopts microwave spouting drying, and changes the original continuous spouting to pulse spouting, so that the materials are dried more uniformly.

DETAILED DESCRIPTION

Various Embodiments of the present disclosure relate to methods for preparing and conditioning a small amount of granular burdock roots through combined uniform drying by using RF pretreatment and microwave pulse spouting 1 Kilogram (kg) fresh burdock roots are selected. Washing, unpeeling and slicing are performed on the burdock roots so that the burdock roots are sliced into slices having the thickness of 5 millimeter (mm). Then, the burdock slices are immersed into an aqueous solution formed by combining 0.5% ascorbic acid and 0.5% sodium chloride in mass concentration for 30 minutes. The burdock slices are then blanched for 3 minutes by using 0.5% D-isoascorbic acid sodium solution at the temperature of 95° C. Then, the burdock slices are dried by RF for 20 minutes with a RF power of 1500 w at the hot wind temperature of 50° C. while a distance between electrodes is 20.5 cm. The burdock slices are then dried through microwave pulse spouting with the drying condition including, for example, at 0-10 minutes. In these instances, a microwave power being 1000 w at the hot wind temperature of 70° C. may be used, and a spouting frequency may be spouting 2 seconds at an interval of 6 seconds. At subsequent 25 minutes, performing drying by using a microwave power being 1500 w, at the hot wind temperature of 65° C., a spouting frequency may be spouting 2 seconds at an interval of 6 seconds. At subsequent 5 minutes, drying may be performed by using a microwave power being 1200 w, at the hot wind temperature of 70° C., and a spouting frequency may be spouting 2 seconds at an interval of 8 seconds. The color and the luster of the dried sample are improved, the lightness index value L is higher than that of a product of hot air drying treatment; furthermore, the sample has strong fragrance, and has ideal crispy texture.

Embodiments of the present disclosure also relate to methods for preparing and conditioning a medium amount of granular burdock roots through combined uniform drying by using RF pretreatment and microwave pulse spouting.

10 kg fresh burdock roots are selected. Washing, unpeeling and slicing are performed on the burdock, so that the burdock roots are sliced into burdock slices having the thickness of 5 mm. Then, the burdock slices are immersed into an aqueous solution formed by combining 0.5% ascorbic acid and 0.5% sodium chloride in mass concentration for 30 minutes. The burdock slices are then blanched for 3 minutes by using 0.5% D-isoascorbic acid sodium solution at the temperature of 95° C. Then, drying is performed by RF for 20 minutes with a RF power of 15 Kilowatt (kw) at the hot wind temperature of 50° C. while a distance between electrodes is 20.5 cm. Addition drying is then performed through microwave pulse spouting with the drying condition including, for example, at 0-10 minutes. In these instances, drying may be performed by using a microwave power with 10 kw at the hot wind temperature of 70° C., and a spouting frequency may be spouting 2 seconds at an interval of 6 seconds. At subsequent 25 minutes, drying may be performed by using a microwave power being 15 kw, at the hot wind temperature of 65° C., and a spouting frequency may be spouting 2 seconds at an interval of 6 seconds. At subsequent 5 minutes, drying may be performed by using a microwave power with 12 kw, at the hot wind temperature of 70° C., and a spouting frequency may be spouting 2 seconds at an interval of 8 seconds. The color and the luster of the dried sample are improved, the lightness index value L is higher than that of a product of hot air drying treatment; furthermore, the sample has strong fragrance, and has ideal crispy texture.

Embodiments of the present disclosure may also relate to methods for preparing and conditioning a large amount of granular burdock roots through combined uniform drying by using RF pretreatment and microwave pulse spouting.

50 kg fresh burdock roots are selected. Washing, unpeeling and slicing are performed on the burdock roots so that the burdock roots are sliced into burdock slices having the thickness of 5 mm. Then, the burdock slices are immersed into an aqueous solution formed by combining 0.5% ascorbic acid and 0.5% sodium chloride in mass concentration for 30 minutes. The burdock slices are blanched for 3 minutes by using 0.5% D-isoascorbic acid sodium solution at the temperature of 95° C. The, drying is performed by RF for 20 minutes with a RF power of 75 kw at the hot wind temperature of 50° C. while a distance between electrodes is 20.5 cm. Then, additional drying may be performed through microwave pulse spouting with the drying condition including, for example, at 0-10 minutes. In these instances, drying may be performed using a microwave power with 50 kw at the hot wind temperature of 70° C., and a spouting frequency may be spouting 2 seconds at an interval of 6 seconds. At subsequent 25 minutes, drying may be performed by using a microwave power being 75 kw, at the hot wind temperature of 65° C., and a spouting frequency may be spouting 2 seconds at an interval of 6 seconds. At subsequent 5 minutes, drying may be performed by using a microwave power with 60 kw, at the hot wind temperature of 70° C., and a spouting frequency may be spouting 2 seconds at an interval of 8 seconds. The color and the luster of the dried sample are improved, the lightness index value L is higher than that of a product of hot air drying treatment; furthermore, the sample has strong fragrance, and has ideal crispy texture.

What is claimed is:

1. A method for preparing and conditioning burdock roots through combined uniform drying by using radio frequency (RF) pretreatment and microwave with pulse spouting, the method comprising:
   performing pretreatment on burdock roots to generate burdock slices;
   immersing the burdock slices into an aqueous solution containing 0.1%-1.0% ascorbic acid and 0.1%-1.0% sodium chloride in a mass concentration for 10-60 minutes;
   performing blanching on the burdock slices for 1-10 minutes by using 0.1%-1.0% D-isoascorbic acid sodium solution at a temperature of 70° C.-95° C.;
   pre-drying the burdock slices by applying radio frequency for 20 minutes having a power of 1.5-2 W/g, and also applying hot wind with a temperature of 50° C., and wherein the radio frequency is generated by electrodes that are separated by 20.5 centimeters;
   performing a first drying on the burdock slices by applying microwave with pulse spouting for greater than 0 minutes, to 10 minutes, wherein the microwave has a microwave power of 1.0-1.5 W/g and the pulse spouting applies a hot wind having a temperature of 70-75° C. and a frequency of 2 seconds at an interval of 6 seconds;
   performing a second drying on the burdock slices for 25 minutes by applying microwave with pulse spouting, wherein the microwave has a microwave power of 1.5-2.0 W/g and the pulse spouting applies a hot wind having a temperature of 65-70° C. and a frequency of 2 seconds at an interval of 6 seconds; and
   performing a third drying on the burdock slices for 5 minutes, by applying microwave with pulse spouting, wherein the microwave has a microwave power of 1.0-1.5 W/g, and the pulse spouting applies a hot wind having a temperature of 70-75° C. and a frequency of 2 seconds at an interval of 8 seconds.

2. The method according to claim 1, wherein the concentration of the ascorbic acid is 0.5%, and the concentration of the sodium chloride is 0.5%; the immersing of the burdock slices into the aqueous solution comprises immersing the burdock slices into the aqueous solution for 30 minutes; the temperature of the blanching being 95° C., the concentration of the D-isoascorbic acid sodium solution is 0.5%, and the period of the blanching is 3-5 minutes.

3. The method according to claim 1, wherein the microwave power of the first drying is 1.0 W/g with the hot wind temperature being 70° C. for 0-10 minutes.

4. The method according to claim 3, wherein the microwave power of the second drying is 1.5 W/g with the hot wind temperature being 65° C. for 25 minutes.

5. The method according to claim 4, wherein the microwave power of the third drying is 1.2 W/g with the hot wind temperature being 70° C. for 5 minutes.

6. The method according to claim 1, wherein the pretreatment comprises washing, unpeeling and slicing the burdock roots, and the burdock roots are fresh burdock roots.

7. The method according to claim 1, wherein the burdock roots are sliced into the burdock slices each having a thickness of 4-5 millimeters (mm).

8. The method according to claim 1, further comprises packaging dried burdock roots by using a vacuum aluminum foil bag.

\* \* \* \* \*